United States Patent
Li et al.

(10) Patent No.: US 8,051,737 B2
(45) Date of Patent: Nov. 8, 2011

(54) WORM GEAR DRIVE

(75) Inventors: Feng Li, Shenzhen (CN); Jing Ning Ta, Hong Kong (CN)

(73) Assignee: Johnson Electric S.A., La Chaux-de-Fonds (CH)

( * ) Notice: Subject to any disclaimer, the term of this patent is extended or adjusted under 35 U.S.C. 154(b) by 542 days.

(21) Appl. No.: 11/907,275

(22) Filed: Oct. 10, 2007

(65) Prior Publication Data

US 2008/0087123 A1    Apr. 17, 2008

(30) Foreign Application Priority Data

Oct. 11, 2006  (CN) .......................... 2006 1 0146490

(51) Int. Cl.
    *F16H 1/16*    (2006.01)
(52) U.S. Cl. .......................................... 74/425
(58) Field of Classification Search ............ 74/425; 384/192, 205, 262, 263, 264, 248, 249, 243, 384/244, 245
    See application file for complete search history.

(56) References Cited

U.S. PATENT DOCUMENTS

| | | | | |
|---|---|---|---|---|
| 1,122,800 A | * | 12/1914 | Pflueger ........................ | 384/249 |
| 5,777,411 A | * | 7/1998 | Nakajima et al. ............... | 310/83 |
| 5,872,412 A | | 2/1999 | Mita et al. | |
| 6,965,180 B2 | * | 11/2005 | Oh et al. ........................ | 310/90 |
| 2001/0010280 A1 | * | 8/2001 | Torii et al. ...................... | 192/38 |
| 2005/0241420 A1 | | 11/2005 | Oberle et al. | |
| 2007/0137351 A1 | * | 6/2007 | Schwendemann .............. | 74/425 |
| 2007/0186709 A1 | * | 8/2007 | Schwendemann .............. | 74/425 |
| 2007/0295135 A1 | * | 12/2007 | Kidowaki ....................... | 74/425 |

FOREIGN PATENT DOCUMENTS

| | | |
|---|---|---|
| DE | 60910 | 3/1968 |
| DE | 19725693 C1 | 12/1998 |
| EP | 1139545 A2 | 10/2001 |
| GB | 578622 A | 7/1946 |
| GB | 2356910 A | 6/2001 |

* cited by examiner

*Primary Examiner* — Thomas R Hannon
*Assistant Examiner* — Phillip A Johnson
(74) *Attorney, Agent, or Firm* — Birch, Stewart, Kolasch & Birch, LLP

(57) ABSTRACT

A worm gear drive has a self locking gear train. The gear train comprises a worm 34 fitted to a motor shaft 32 and in mesh with a worm wheel 35 which drives the output 26. The motor shaft 32 extends between two thrust bearings 29, 60 having faces 54 which contact respective axial ends of the motor shaft 32. The contact between at least one of the thrust bearings 29 and the shaft 32 is adapted to provide a high frictional force.

12 Claims, 5 Drawing Sheets

WORM GEAR DRIVE

CROSS-REFERENCE TO RELATED APPLICATIONS

This non-provisional patent application claims priority under 35 U.S.C. §119(a) from Patent Application No. 200610146490.1 filed in China on 11 Oct. 2006.

FIELD OF THE INVENTION

This invention relates to worm gear drives and in particular to a self locking worm gear drive.

BACKGROUND OF THE INVENTION

Worm gear drives comprise a worm or helical cog driven by a shaft and in mesh with a worm wheel driving an output, typically a shaft or cog. Worm gear drives are speed step down gearboxes and as such increase the torque developed by the motor driving the shaft. Usually, the driving shaft is the motor shaft and the worm is fitted to the shaft or formed on the shaft.

In certain applications the use of a worm gear drive is desirable due to the simplicity of construction and because of the torque able to be delivered because of the gear ratio. There is a certain loss of power due to friction between the worm and the worm wheel. By making certain modifications, this friction can lead to an arrangement where the load cannot back drive the motor due to the losses in the gears. This is known as self locking, i.e., the input shaft can drive the output shaft but the output shaft can not drive the input shaft, without the use of additional components.

This is highly appreciated in certain applications, such as for lifting heavy loads or for security issues such as for doors and windows, especially windows in a vehicle, where to prevent theft it is important that the windows cannot be pulled down to gain access.

To achieve self locking of the gear train, the design of the worm and the worm wheel has to be modified from ideal or optimal from an efficiency viewpoint. The lead angle is made low, that is, the helical thread of the worm has a greater number of turns per unit of length, also the surface texture of the worm and worm wheel is made rough to increase friction between the two gears thus making it harder for the worm wheel to drive the worm. However, both of these measures decrease the efficiency of the gear drive resulting in the need for a more powerful motor to drive the load. This trade-off has been accepted because of the need for preventing back drive.

A typical prior art worm gear drive has a motor driving a motor shaft. A worm fitted to the shaft and in mesh with a worm wheel fixed to an output shaft. The motor shaft is journalled in bearings, typically oil impregnated sintered bushings, and extends between two thrust bearings. Each end of the motor shaft is rounded and each thrust bearing has a hard flat surface which contacts a respective rounded end of the motor shaft to support the shaft against excessive axial movement caused by the reaction forces on the shaft as the worm tries to turn the worm wheel. The rounded end of the shaft makes a point contact with the respective thrust surface, which point lies on the axis of the shaft to minimise frictional losses therebetween. The thrust surfaces also support the shaft against axial movement when the worm wheel tries to drive the worm as when a rotational load is applied to the output shaft. Due to the low lead angle of the worm and the friction of the gear interface, the worm wheel tries to drive the motor shaft axially rather than cause the worm to rotate, thus locking the gears. A small gap, known as end play, is left between the ends of the motor shaft and the thrust bearings under no load conditions. This allows for thermal expansion of the shaft but also means that the shaft only contacts one thrust bearing at a time and slight axial movement of the shaft will occur when the axial forces change direction.

There are other designs of lockable gear drives which allow an efficient gear train and these can use a smaller lighter motor. These designs have a separate braking or clutch mechanism to prevent back drive but these mechanisms are usually complex, prone to failure and add weight and cost to the final assembly. As a separate locking mechanism is required, these drives are not self locking.

Accordingly, there is the desire for a self locking worm gear drive which is simple and efficient.

SUMMARY OF THE INVENTION

The present invention provides a self locking worm gear drive which has a simple and efficient structure. The invention removes the locking feature from the gear interface, allowing the gears to be designed for maximum efficiency or at least better matched to the application and adds the self lock feature to the thrust bearing interface. This is achieved by increasing the friction between the end of the motor shaft, and one or both of the thrust bearing plates. The preferred method of achieving this increased friction is by providing a recess in the surface of the thrust bearing so that the contact between the shaft end and the thrust surface is shifted from the axis of the shaft.

Accordingly, in one aspect thereof, the present invention provides a worm gear drive comprising:
  a shaft;
  a gear train including a worm on the shaft, a worm wheel meshed with the worm and an output associated with the worm wheel and driven thereby;
  wherein the shaft is rotatably supported by bearings and axially disposed between first and second thrust bearings, the first and second thrust bearings each having a thrust face arranged to contact respective first and second ends of the shaft to limit axial movement of the shaft, and
  wherein the first end of the shaft makes a high friction sliding contact with the thrust face of the first thrust bearing.

Preferably, the thrust face of the first thrust bearing has a non-planar surface adapted to make contact with the first end of the shaft at a location which is not on the axis of the shaft.

Preferably, the thrust face of the first thrust bearing has a recess at a location corresponding to the axis of the shaft.

Preferably, the recess is a blind hole.

Preferably, the blind hole is circular and coaxial with the shaft.

Preferably, the first end of the shaft is rounded and contacts the first thrust face along the edge of the recess.

Preferably, the thrust face of the first thrust bearing makes a circular line contact with the rounded first end of the shaft.

Preferably, the circular line contact is a continuous line contact.

Optionally, the recess has an irregular shape.

Preferably, the second end of the shaft makes a high friction sliding contact with the thrust face of the second thrust bearing.

Preferably, the thrust face of the second thrust bearing has a similar configuration to the thrust face of the first thrust bearing.

Preferably, the worm gear drive further comprises a motor and the shaft is a part of the motor, i.e., the motor shaft.

Preferably, the motor has a housing supporting two arcuate ceramic magnets forming the stator and the gear train has a gearbox housing connected to the motor housing and the first and second thrust bearings are supported by the motor housing and gearbox housing, the gearbox housing further supporting a stub axle on which the worm wheel and output are rotatably mounted and the output is connected to the worm wheel by a shock absorbing interface.

BRIEF DESCRIPTION OF THE DRAWINGS

The preferred embodiment of the present invention will now be described, by way of example only with reference to the accompanying drawings, in which.

DETAILED DESCRIPTION OF THE PREFERRED EMBODIMENT

Figure 1:
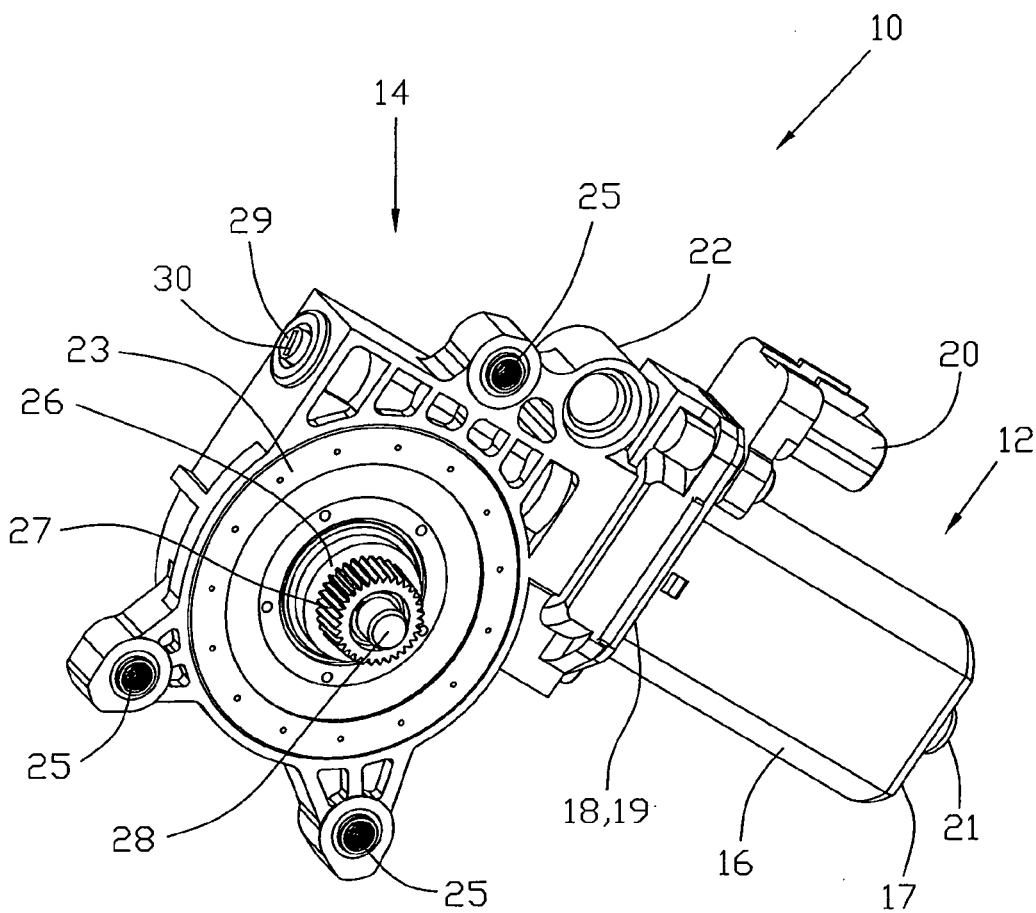
FIG. 1 is a perspective view of a worm gear drive according to a preferred embodiment of the present invention.

The apparatus of FIG. 1 is a worm gear drive 10 according to the preferred embodiment of the present invention. The drive comprises a motor 12 and a gearbox 14. The motor is bolted directly to the gearbox. This drive is used for moving a window in a passenger vehicle and is of the type commonly referred to as a window lift motor.

The motor 12 is a PMDC motor having a deep drawn steel housing 16 having a closed lower end 17 and an open upper end 18. The open end has a flange 19 for mounting an electrical connector 20 and the gearbox 14. A bearing retainer or boss 21 is formed in the closed end 17 for mounting a thrust bearing and a shaft bearing.

The gearbox 14 has a gearbox housing 22 accommodating the gear train. The gearbox housing 22 includes a lid 23 for closing the gearbox. The gearbox housing has three mounting holes 25 for mounting the drive to a support bracket in the door of a vehicle. The lid 23 is shown fixed to the gearbox housing 22.

Extending through the lid 23 is the output 26 of the drive. Output 26 comprises a drive plate and an integrally formed drive cog 27 which is mounted for rotation on an axle 28 which also extends through the lid 23. Just visible on a side of the gearbox housing opposite the motor is what appears to be a small slotted button. This is thrust bearing 29. Slot 30 in the outer end of the button facilitates screwing of the thrust bearing 29 into a receiving recess in the gearbox housing. By being screwed, axial position of the thrust bearing 29 can be easily adjusted to set the end play for the motor.

Figure 2:
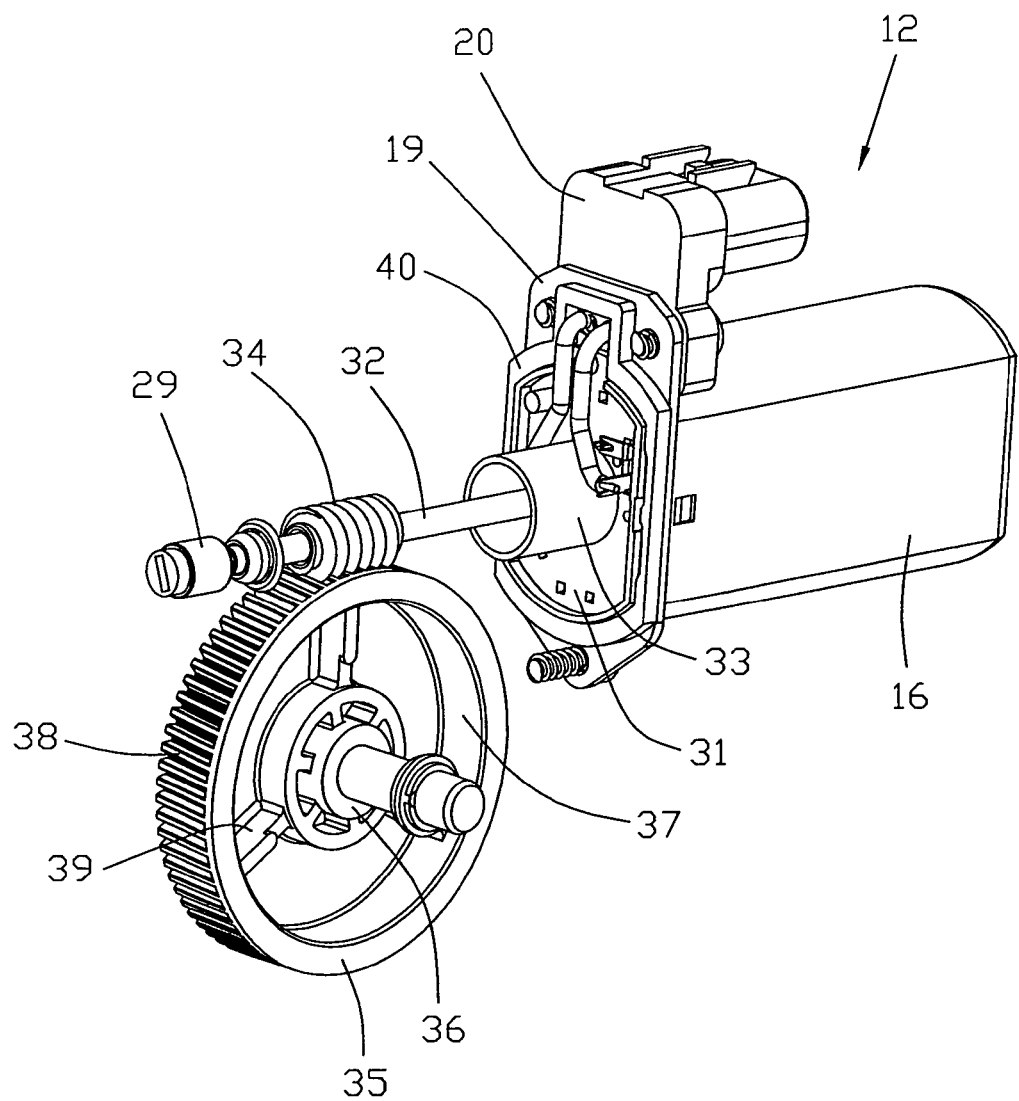
FIG. 2 is a view similar to FIG. 1 with some parts removed to reveal the gear train.

Inside the gearbox, as shown in FIG. 2, is the worm drive gear train. Also visible is an end cap 31 which closes off the open end 18 of the motor housing 16. It also supports a bearing (not shown) for the motor shaft 32 and brushes and optionally, noise suppression components for the motor. The end cap 31 is shown with a cylindrical tubular extension 33 surrounding the shaft 32. This is for keying the motor 12 to the gearbox 14. Shaft 32 supports a worm which is in mesh with a worm wheel. The worm is a helical cog pressed onto the shaft though it is known to cut or form the worm directly on the shaft. The worm wheel 35 is of a dish shape with a central boss 36 which is rotatably mated on the axle 28. Three ribs 39 extend from the boss to a peripheral rim 37. Teeth 38 which mesh with the threads of the worm 34 are formed on the radially outer surface of the rim. Optionally, the teeth are of the half arc form for greater strength. A seal 40 of elastomeric material is provided between the end cap and the gearbox housing to seal the commutator against ingress of water.

Thrust bearing 29 is shown adjacent to or butting against the distal end of the shaft 32. Although not shown, a sleeve bearing, optionally of the self-aligning, oil impregnated, sintered bushing type, may be held by the gearbox housing and rotationally supporting the distal end of the shaft. Alternatively, the distal end of the shaft may be rotationally supported by a part of the gearbox housing. Such rotating bearing support is provided, if desired, between the thrust bearing 29 and the worm 34.

Figure 3:
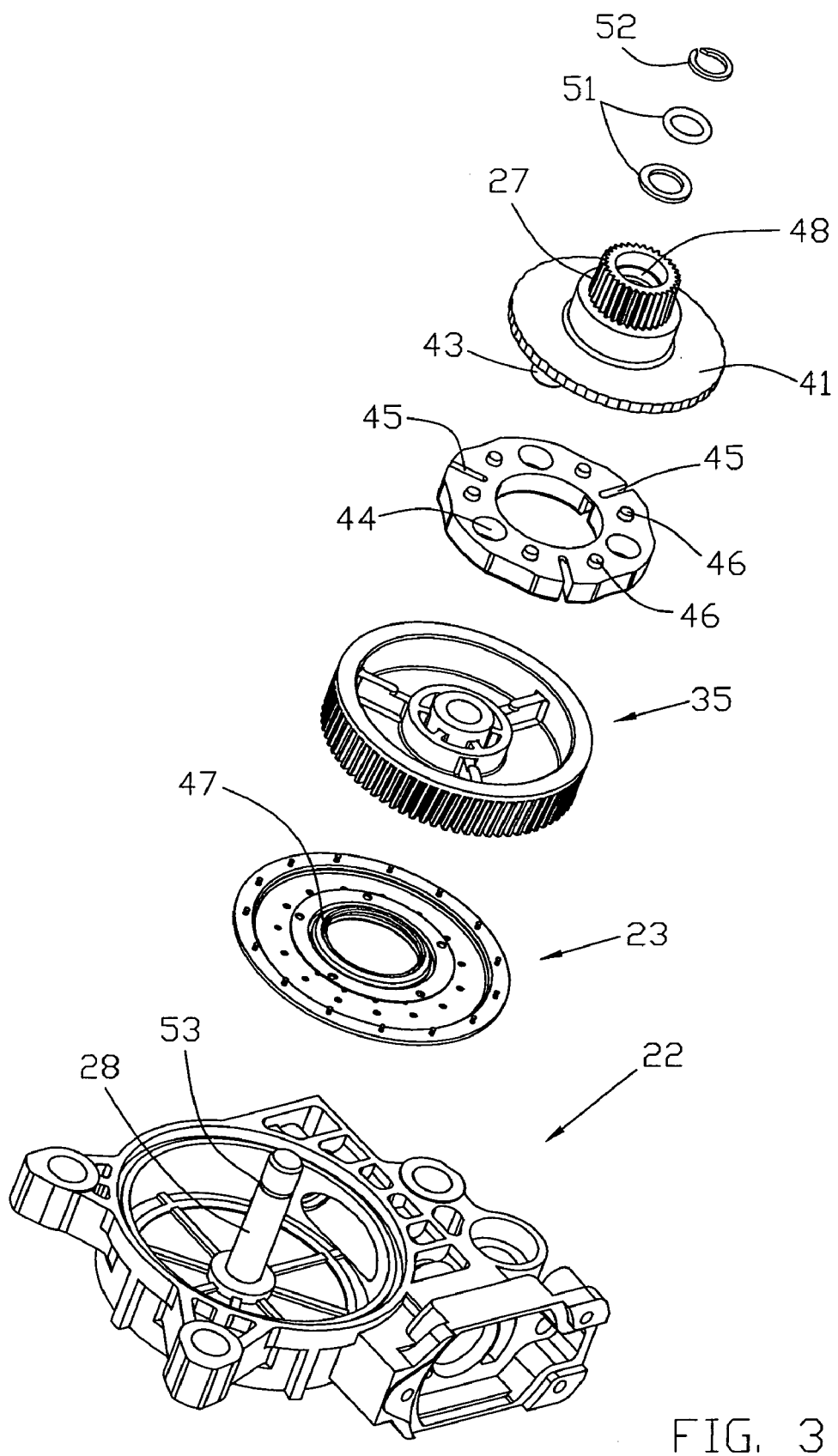
FIG. 3 is an exploded view of the worm wheel and gear box housing being parts of the drive of FIG. 1.

The gearbox is shown exploded in FIG. 3 illustrating the connection between the worm wheel 35 and the drive plate 41. A damper 42 of, preferably, elastomeric material is used to transmit the driving torque between the worm wheel 35 and the drive plate 41. The drive plate has a lower surface from which extends three spigots 43. The spigots extend into holes 44 in the damper 42. The damper 42 has three slots 45 which receive the ribs 39 of the worm wheel 35. Damper 42 also has a number of small projections 46 on its upper surface to space the damper slightly from the drive plate 41 to allow room for resilient deformation of the damper. The damper absorbs sudden shocks applied to the output by external forces. The axle 28 is supported by the gearbox housing 22 which may be directly molded thereto. Optionally, bearings, not shown, rotatably support the drive plate and worm wheel on the axle. A central through passage 48 in the drive plate accommodates the axle 28. One or more seals 47 seal the drive plate to the gearbox lid and to the axle to prevent ingress of water.

Figure 4:
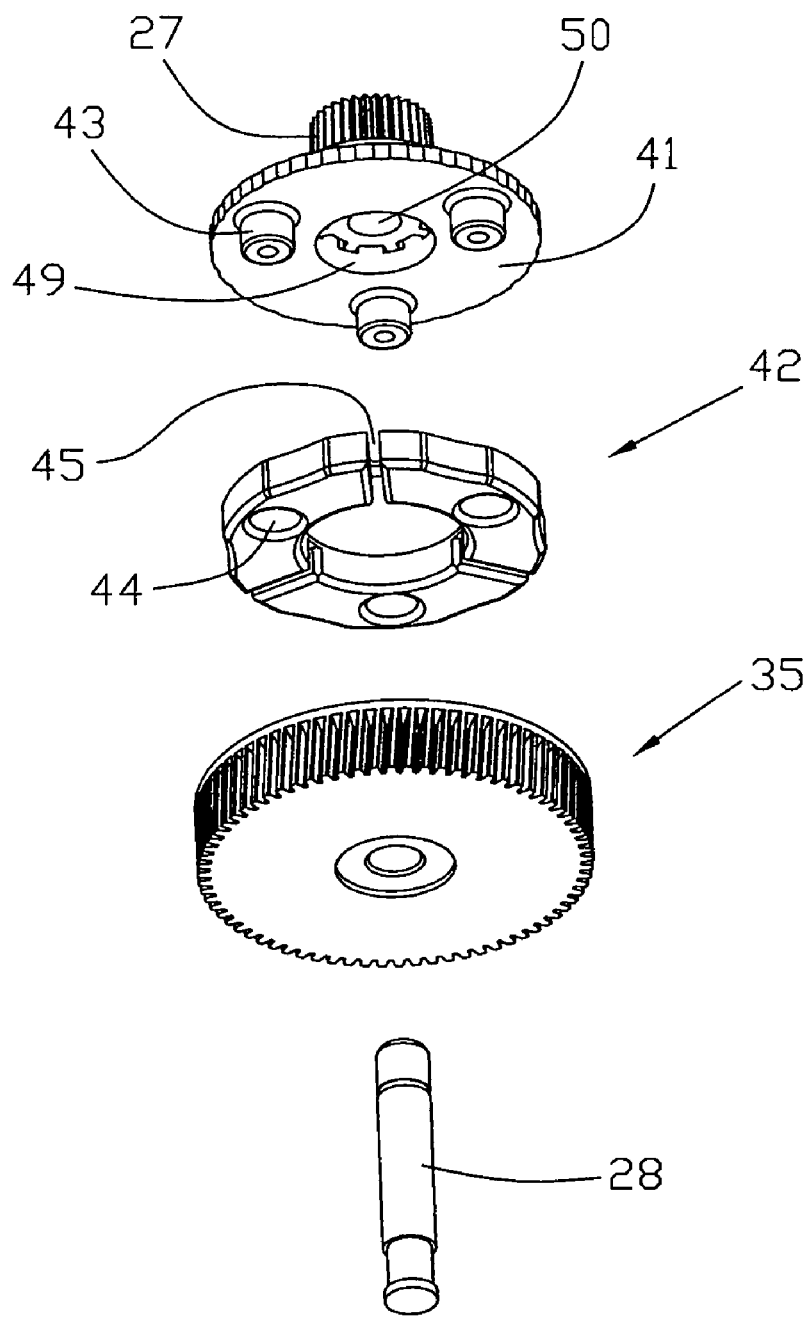
FIG. 4 is an exploded view of the worm wheel of FIG. 3 from a different angle.

FIG. 4 illustrates the worm wheel/drive plate/damper connection from a different angle showing more clearly the spigots 43. Also visible in this view is an enlargement 49 of the central through passage 48 in the drive plate 41. The enlargement 49 serves as a bearing housing 50 supporting a bearing of the drive plate 41 that rides on axle 28.

A spring clip 52 locates in a circumferential groove 53 in the axle 28 to prevent axial separation of the drive plate 41 from the axle 28. Spring clip 52 may be an E-clip, C-clip, circlip, etc.

Figure 5:
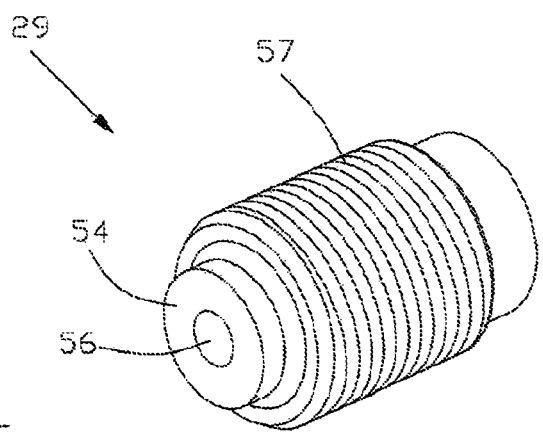
FIG. 5 is an enlarged view of a thrust bearing of the drive of FIG. 1.

FIG. 5 illustrates the thrust face 54 of the first thrust bearing 29. The thrust bearing 29 as briefly described before, has a cylindrical body having a screw thread 57 formed on the cylindrical surface for screw positioning in the thrust bearing recess of the gearbox housing. The thrust face 54 is substantially planar with a recess 56 forming a hole which, in use, is approximately co-axial with the motor shaft 32. The thrust face 54 optionally is stepped from the outer surface of the thrust bearing.

Figure 6:
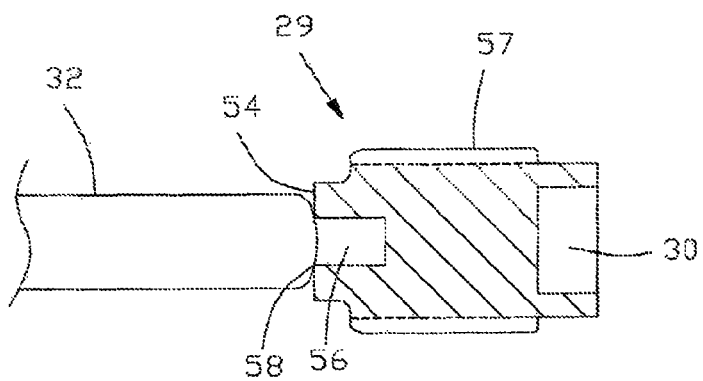
FIG. 6 is a schematic used to explain the connection between the motor shaft and the thrust bearing.

FIG. 6 illustrates the contact between the rounded first end of the shaft 32 and the first thrust bearing 29. The thrust bearing is shown in cross-section. The body of the thrust bearing is cylindrical with the screw thread 57 formed on the outer cylindrical surface. A slot 30 is formed in one end of the thrust bearing for receiving a blade of a screw driver for positioning of the thrust bearing in the gearbox housing.

The opposite end is the thrust face 54. At the centre of the thrust face is the recess 56 formed as a round blind hole. The hole is co-axial with the shaft and the rounded end of the shaft contacts the thrust face along the edge of the recess, thus forming a circular line contact, spaced from the axis of the shaft. Recesses of other shapes are possible, including irregular recesses, but round holes are preferred due to simplicity in making.

As the frictional force is related to the radius of the contact position, the greater the circular line contact is spaced from the axis of the shaft, the greater the force. Thus, the frictional force generated can be increased by moving the contact further away from the axis.

The friction can also be modified by selecting an appropriate material for the thrust bearing.

Figure 7:
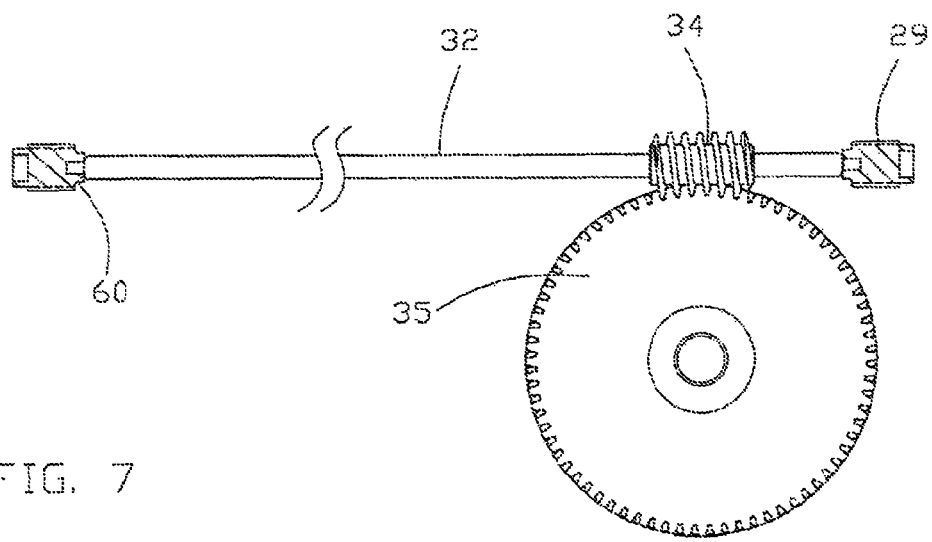
FIG. 7 is a schematic view of the motor shaft and two thrust bearings according to a second embodiment of the present invention.

FIG. 7 illustrates a bi-directional self-locking worm drive. First thrust bearing 29 is as described above. A second thrust bearing 60 adjacent the second end of the shaft 32 which is also rounded, has a thrust face which is also formed with a recess arranged such that the axis of shaft 32 passes through this recess. Optionally, the recesses of both thrust bearings are round holes co-axial with the shaft and arranged to increase the friction between the shaft and the thrust bearings. As the second thrust bearing is located within the bearing recess of the motor housing, it is not adjustable axially and does not require a screw threaded outer surface.

In use, when driving the worm wheel, either clockwise or anti-clockwise (up or down), the reaction between the worm and the worm wheel causes the shaft to press against a respective one of the thrust bearings. Should the worm wheel try to drive the motor, the worm wheel, through the worm, will cause the shaft to press against the other one of the thrust bearings, at which point, because of the increased friction between the thrust bearing and the shaft and because of the gear ratio between the worm and the worm wheel, the shaft will lock against the thrust bearing and the motor will not rotate, hence locking the worm drive.

Hence, by providing a high friction thrust bearing at one or both ends of the motor shaft or driving shaft, the worm drive can be made self-locking in a simple manner without degrading the gear interface between the worm and the worm wheel.

While the invention has been described with respect to one embodiment of one specific application, the invention has far greater application and many variations will be readily apparent to those skilled in the art. Accordingly, the invention should only be limited to that defined by the following claims.

The invention claimed is:

1. A worm gear drive which comprises:
 a shaft having an axis;
 a gear train including a worm on the shaft, a worm wheel meshed with the worm and an output associated with the worm wheel and driven thereby;
 wherein the shaft is rotatably supported by bearings and axially disposed between first and second thrust bearings the first and second thrust bearings each having a thrust face arranged to contact respective first and second ends of the shaft to limit axial movement of the shaft,
 wherein the thrust face of the first thrust bearing has a recess at a location corresponding to the axis of the shaft, the recess defining an opening which is smaller than the diameter of the shaft, and
 wherein the first end of the shaft is convexly rounded and contacts the thrust face on the edge of the recess at locations removed from the axis of the shaft.

2. The worm gear drive of claim 1, wherein the recess is a blind hole.

3. The worm gear drive of claim 2, wherein the blind hole is circular and coaxial with the shaft.

4. The worm gear drive of claim 1, wherein the thrust face of the first thrust bearing makes a line contact with the rounded first end of the shaft.

5. The worm gear drive of claim 4, wherein the line contact is a continuous line contact.

6. The worm gear drive of claim 4, wherein the line contact forms a circular path.

7. The worm gear drive of claim 1, wherein the thrust face of the second thrust bearing is substantially the same as the thrust face of the first thrust bearing, and the second end of the shaft is rounded and contacts the second thrust bearing on the edge of the recess at locations spaced from the axis of the shaft.

8. The worm gear drive of claim 1, further comprising a motor and the shaft is a part of the motor.

9. The worm gear drive of claim 8, wherein the motor has a housing and the gear train has a gearbox housing connected to the motor housing and the first and second thrust bearings are supported by the motor housing and gearbox housing, the gearbox housing further supporting a stub axle on which the worm wheel and output are rotatably mounted and the output is connected to the worm wheel by a shock absorbing interface.

10. A worm gear drive which comprises:
 a shaft having an axis;
 a gear train including a worm on the shaft, a worm wheel meshed with the worm and an output associated with the worm wheel and driven thereby;
 wherein the shaft is rotatably supported by bearings and axially disposed between first and second thrust bearings, the first and second thrust bearings each having a thrust face arranged to contact respective first and second ends of the shaft to limit axial movement of the shaft, the thrust face having a recess at a location corresponding to the axis of the shaft, the recess defining an opening which is smaller than the diameter of the shaft, enabling the thrust face of the first thrust bearing to contact the end of the shaft at locations removed from the axis of the shaft, and wherein the first end of the shaft is convexly rounded and contacts the thrust face on the edge of the recess, whereby the first thrust bearing contacts the first end of the shaft along a circular contact line at a location spaced from the axis of the shaft.

11. The worm gear drive of claim 10, wherein the circular contact line is coaxial with the axis of the shaft.

12. The worm gear drive of claim 10, wherein the second thrust bearing has substantially the same configuration as the first thrust bearing.

* * * * *